US012780027B2

(12) United States Patent
Langer et al.

(10) Patent No.: US 12,780,027 B2
(45) Date of Patent: Nov. 3, 2026

(54) METHOD AND SYSTEM FOR DYNAMIC WIRELESS CHARGING OF AN ELECTRIC VEHICLE ON ELECTRIC ROADS

(71) Applicants: HYUNDAI MOTOR COMPANY, Seoul (KR); KIA CORPORATION, Seoul (KR)

(72) Inventors: Ingmar Langer, Darmstadt (DE); Lukas Gass, Mainz (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 654 days.

(21) Appl. No.: 18/220,699

(22) Filed: Jul. 11, 2023

(65) Prior Publication Data

US 2024/0300357 A1 Sep. 12, 2024

(30) Foreign Application Priority Data

Mar. 6, 2023 (DE) ........................ 102023105376.0

(51) Int. Cl.

*B60L 53/38* (2019.01)
*B60L 53/12* (2019.01)
*B60L 53/36* (2019.01)
*H02J 50/10* (2016.01)
*H02J 50/90* (2016.01)

(52) U.S. Cl.

CPC ............... *B60L 53/38* (2019.02); *B60L 53/12* (2019.02); *B60L 53/36* (2019.02); *H02J 50/10* (2016.02); *H02J 50/90* (2016.02); *B60L 2240/647* (2013.01); *B60L 2240/70* (2013.01)

(58) Field of Classification Search

CPC ........ B60L 53/126; B60L 53/38; B60L 53/12; B60L 53/36; B60L 5/005; B60L 2240/647; B60L 2240/70; H02J 50/10; H02J 50/90; H02J 50/12

See application file for complete search history.

(56) References Cited

U.S. PATENT DOCUMENTS 5,595,271 A * 1/1997 Tseng ...................... B60L 8/003 191/4
5,669,470 A * 9/1997 Ross ..................... B60L 53/126 320/109
5,821,728 A * 10/1998 Schwind ................ H02J 50/40 320/108

(Continued)

FOREIGN PATENT DOCUMENTS

WO 2016014294 A1 1/2016

*Primary Examiner* — Zachary L Kuhfuss
(74) *Attorney, Agent, or Firm* — Lempia Summerfield Katz LLC

(57) ABSTRACT

A method and a system for dynamic wireless charging of an electric vehicle on electric roads are disclosed. The method includes determining, by a system controller of the electric vehicle, that a traction battery of the electric vehicle needs to be recharged. The method also includes assessing, by the system controller, road surface unevenness along an electric road considered for recharging the electric vehicle. The method further includes adapting, by the system controller based on the assessed road surface unevenness, at least one of a driving route of the electric vehicle, a current driving trajectory of the electric vehicle, a recharging configuration of the electric vehicle, or a combination thereof.

17 Claims, 1 Drawing Sheet

(56) References Cited

U.S. PATENT DOCUMENTS

| | | | | |
|---|---|---|---|---|
| 9,739,844 | B2 | 8/2017 | Widmer et al. | |
| 10,124,690 | B2 * | 11/2018 | Ricci | B60L 53/665 |
| 10,189,363 | B2 * | 1/2019 | Ricci | B60L 53/126 |
| 2012/0186927 | A1 * | 7/2012 | Suh | B60L 50/51 191/10 |
| 2013/0328387 | A1 | 12/2013 | Venkateswaran et al. | |
| 2016/0025821 | A1 | 1/2016 | Widmer et al. | |
| 2017/0028854 | A1 * | 2/2017 | Lee | B60L 53/12 |
| 2017/0136897 | A1 * | 5/2017 | Ricci | B60L 5/005 |
| 2017/0136905 | A1 * | 5/2017 | Ricci | B60L 53/65 |
| 2017/0136907 | A1 * | 5/2017 | Ricci | B60M 7/003 |
| 2017/0136910 | A1 * | 5/2017 | Ricci | B60L 53/65 |
| 2018/0037136 | A1 * | 2/2018 | Nelson | G01C 21/00 |
| 2018/0194239 | A1 * | 7/2018 | Chevret | B60L 5/38 |
| 2023/0226937 | A1 * | 7/2023 | Hanson | B60L 53/36 30/108 |

* cited by examiner

METHOD AND SYSTEM FOR DYNAMIC WIRELESS CHARGING OF AN ELECTRIC VEHICLE ON ELECTRIC ROADS

CROSS-REFERENCE TO RELATED APPLICATION

This application claims the benefit of and priority to German Patent Application No. 102023105376.0, filed on Mar. 6, 2023, the entire contents of which are incorporated herein by reference.

TECHNICAL FIELD

The present disclosure relates to a method and a system for dynamic wireless charging of an electric vehicle on electric roads as well as to an electric vehicle equipped with such a system.

BACKGROUND

Vehicle electrification is an ongoing trend in the automotive sector. However, electric charging is often considered to be a crucial bottleneck in vehicle electrification. Wireless charging during driving has been proposed as a potential solution for enabling more hassle-free usage of battery electric vehicles. Different manufacturers have been working on such wireless charging system including, amongst others, Electreon and Witricity. In a typical wireless charging system on the road system, transmitting power transfer couplers are embedded under the road surface. The transmitting power transfer couplers interact inductively with respective receiving devices at the underfloor of the vehicles.

An important prerequisite for such systems to be efficient are short and stable distances between transmitting and receiving devices. However, road surfaces are not always perfectly flat due to bumps, potholes, undulations and so on. In order to avoid damage to the lowest underfloor parts, a high safety margin could be chosen. This may come, however, at the expense of a sub-optimal charging efficiency. Document WO 2016/014294 A1 describes guidance and alignment systems for wireless charging systems to assist in aligning transmitter and receiver inductive power transfer couplers. The described inductive charging of electric vehicles can be used with static charging systems or dynamic charging systems.

In 2013 Mercedes introduced a suspension system coupled with a road sensing system (road surface scan) in series production, i.e., the so-called “Magic Body Control”, which anticipates expected shocks due to bumps and other irregularities that are detected on the road surface.

In prior art document US 2013/0328387 A1 an electric supercapacitor module is utilized as the primary power source for the propulsion unit of electrically powered vehicles. The vehicle operates in conjunction with roadway embedded wireless chargers, which continually charge the vehicle’s supercapacitor while the vehicle is in motion to maintain the motion and materially increase the vehicle’s range without limitation.

SUMMARY

Embodiments of the present disclosure provide wireless charging on the road solutions with improved dynamic charging utilization and better charging efficiency for realistic road conditions.

To this end, the present disclosure provides a method, a system, and an electric vehicle.

According to an aspect of the present disclosure, a method for dynamic wireless charging of an electric vehicle on electric roads includes determining, by a system controller of the electric vehicle, that a traction battery of the electric vehicle needs to be recharged. The method also includes assessing, by the system controller, road surface unevenness along an electric road considered for recharging the electric vehicle. The method further includes adapting, by the system controller based on the assessed road surface unevenness, at least one of a driving route of the electric vehicle, a current driving trajectory of the electric vehicle, a recharging configuration of the electric vehicle, or a combination thereof.

According to another aspect of the present disclosure, a system for dynamic wireless charging of an electric vehicle on electric roads comprises a system controller. The system controller is configured to determine that a traction battery of the electric vehicle needs to be recharged. The system controller is also configured to assess road surface unevenness along an electric road considered for recharging the electric vehicle. The system controller is further configured to, based on the assessed road surface unevenness, adapt at least one of a driving route of the electric vehicle, a current driving trajectory of the electric vehicle, a recharging configuration of the electric vehicle, or a combination thereof.

According to yet another aspect of the present disclosure, an electric vehicle comprises a system for dynamic wireless charging. The system is configured to determine that a traction battery of the electric vehicle needs to be recharged. The system is also configured to assess road surface unevenness along an electric road considered for recharging the electric vehicle. The system is further configured to, based on the assessed road surface unevenness, adapt at least one of a driving route of the electric vehicle, a current driving trajectory of the electric vehicle, a recharging configuration of the electric vehicle, or a combination thereof.

Embodiments of the present disclosure optimize the dynamic wireless charging capability of an electric vehicle by evaluating the road surface along the electric road considered for charging the electric vehicle and, based on the road surface, adapting the recharging configuration of the vehicle, and/or choosing a particularly suited route, lane, and/or path for the vehicle.

Different routes, lanes, and/or paths within a lane can lead to improved dynamic charging utilization due to better charging efficiency in a case that less and/or smaller road surface irregularities are to be expected. Road surface unevenness as used herein includes any kind of deviation of the effective road surface from a perfectly flat shape, e.g., because of a defective shape due to bumps, potholes, undulations, grooves, and so on, and also due to substances and/or objects on the road surface.

Alternatively, or additionally, the configuration of the recharging system of the vehicle may be adapted to the actual and/or anticipated road conditions. Thus, the recharging system of the vehicle can actively and dynamically reconfigure itself before and/or during charging by considering the expected road surface unevenness. For example, the recharging system may reconfigure itself based on estimated and/or measured vertical changes in the road surface that may affect the distance between transmitting inductive couplers on, or in, the road and receiving inductive couplers on the vehicle.

As used herein, the term “vehicle” or “vehicular” or other similar term is inclusive of electric vehicles in general such as passenger automobiles including sports utility vehicles (SUV), buses, trucks, various commercial vehicles, and the like, and includes hybrid vehicles, plug-in hybrid electric vehicles and so on. As used herein, a "hybrid vehicle" is a vehicle that has two or more sources of power, for example, a vehicle that is both gasoline-powered and electric-powered.

Advantageous embodiments and improvements of the present disclosure are disclosed and described herein.

According to an aspect, the system for dynamic wireless charging may further comprise a sensor system configured to monitor the road in the front of the electric vehicle for assessing road surface unevenness. The method for dynamic wireless charging may correspondingly comprise monitoring the road in the front of the electric vehicle with a sensor system for assessing road surface unevenness.

Hence, the road ahead of the vehicle may be evaluated with regards to its surface structure such that an optimal path and/or route can be chosen and/or the vehicle may be adapted to the detected road surface. In embodiments, various sensor systems can be utilized including cameras, lidars, lasers and so on, which may be already present in the vehicle for different purposes.

According to an aspect, the system controller may be configured to assess road surface unevenness by considering road data provided from a vehicle fleet and/or a navigation system of the electric vehicle. The method may correspondingly comprise considering road data provided from a vehicle fleet and/or a navigation system of the electric vehicle for assessing road surface unevenness.

Thus, instead of, or in addition to, monitoring the actual road conditions, the relevant information about the road surface can be gathered from other sources. For example, other vehicles may monitor the road with respective sensing devices and may share their information with the present vehicle, e.g., wirelessly via vehicle to everything (V2X) communication. Such information may also be included in navigation data of a navigation system provided on the electric vehicle. In embodiments, the data from sensor systems of various traffic participants could be shared and collected to continually update and improve a detailed picture of the surface along all potential electric roads within a certain area.

According to an aspect, the system controller may be configured to adapt based on the assessed road surface unevenness at least by optimizing for maximum recharging efficiency of the traction battery.

For example, certain roads, lanes, or trajectories along lanes may be entirely avoided due to present undulations (e.g. longitudinal waves) or other imperfections that would require continuous height adjustments to the recharging system. As another example, a certain route portion may be under construction so that the charging functionality may not be available (e.g., because a mandatory temporary lane may be located along an emergency lane without the necessary equipment being integrated in the road).

According to an aspect, the system controller may be configured to adapt the driving route of the electric vehicle to achieve the flattest road surface on average during charging and/or and the least frequent adaptations of the recharging configuration of the electric vehicle.

Hence, the taken measures can be optimized with the goal to increase the charging efficiency and/or to reduce the adaptation need of the vehicle's recharging configuration.

According to an aspect, the system controller may be configured to adapt the current driving trajectory of the electric vehicle by changing a lane and/or adjusting a lateral position within a lane.

For example, lane centricity and/or a path along the lane could be continually adjusted to avoid road surface issues that would influence the wireless charging operation. In one particular example, bumps on one lane could be entirely avoided when the vehicle switches to a different lane. As another example, a pothole could be avoided within one lane by steering the vehicle away from the pothole accordingly within the lane.

According to an aspect, the system for dynamic wireless charging may further comprise a height-adjustable inductive power transfer coupler. The system controller may be configured to adapt the recharging configuration of the electric vehicle by adapting a height above ground of the inductive power transfer coupler. The method for dynamic wireless charging may correspondingly comprise adapting the height above ground of the height-adjustable inductive power transfer coupler for adapting the recharging configuration of the electric vehicle.

Hence, inductive coils could be adjusted with regards to their height above ground based on the actual shape of the road with the goal to increase the charging efficiency. Inductive coils could be adjusted to minimize the gap between the inductive couplers of the vehicle and the road while keeping a certain safety margin. For example, a camera system of the vehicle may sense a bump ahead of the vehicle. The dynamic wireless charging system may then prepare movement of the charging device within the vehicle upwards into the underfloor until an optimal distance is reached for the particular shape/height of the bump (distance large enough to avoid damages while maximizing efficiency). As soon as the bump is passed by the vehicle, the charging device may return to its default coil position to optimize charging efficiency for normal/ideal road conditions.

According to an aspect, the system controller may be configured to adapt the height above ground based on vertical changes in the road surface in the front of the electric vehicle.

Hence, the configuration of the recharging system can be optimized based on measured vertical distances.

According to an aspect, the system controller may be configured to minimize the height above ground above a lower safety margin.

Thus, on the one hand, damages may be avoided by complying with the safety margin, while on the other hand, efficiency may be optimized by keeping the distance between the inductive couplers as low as possible.

BRIEF DESCRIPTION OF THE DRAWINGS

The accompanying drawings are included to provide a further understanding of the inventive concepts and are incorporated in and constitute a part of this specification. The drawings illustrate embodiments of the present disclosure and, together with the description, serve to explain the principles of the inventive concepts. Other embodiments of the present disclosure and many of the intended advantages of the present disclosure should be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although example embodiments are illustrated and described herein, it should be appreciated by those having ordinary skill in the art that a variety of alternate and/or equivalent implementations may be substituted for the embodiments shown and described without departing from the scope of the present disclosure. Generally, this disclosure is intended to cover various adaptations or variations of the embodiments discussed herein.

When a component, device, element, or the like of the present disclosure is described as having a purpose or performing an operation, function, or the like, the component, device, or element should be considered herein as being "configured to" meet that purpose or perform that operation or function.

Figure 1:
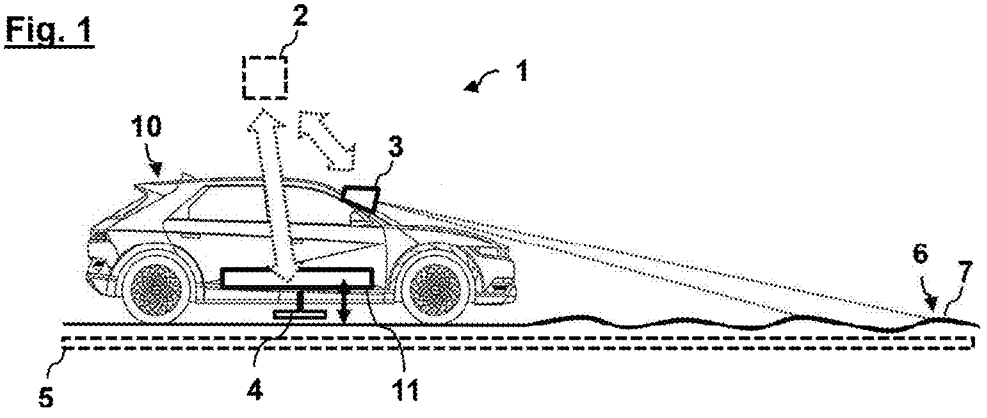
FIG. 1 schematically depicts an electric vehicle equipped with a system for dynamic wireless charging on electric roads according to an embodiment of the disclosure.

FIG. 1 schematically depicts an electric vehicle 10 equipped with a system 1 for dynamic wireless charging on electric roads according to an embodiment of the disclosure. The electric vehicle 10 may be, for example, an autonomous or a self-driving vehicle.

The system 1 includes an inductive power transfer coupler 4 for wirelessly receiving electric power from a corresponding transmitting inductive power transfer coupler 5 on or below the surface of an electric road 6. For stable energy transfer with good efficiency, it is paramount to keep the distance between the couplers 4, 5 as stable and as small as possible. However, to minimize the risk of damage to the vehicle 10, and in particular to its recharging system, a safety margin should be kept between the couplers 4, 5. Accordingly, the receiving coupler 4 on the vehicle would normally not be placed at the maximal possible extension towards the road 6 but would be kept at a certain distance from the ground that offers the best compromise between charging efficiency and damage risk.

Under realistic driving and road conditions, the surface of the road 6 may not be perfectly flat but may suffer from various imperfections like bumps, potholes, surfaces waves, grooves, dirt, ice, liquids and so on, which are collectively referred to herein as "road surface unevenness" 7. This in effect means that the road 6 usually will have certain vertical deviations relative to a perfectly flat surface or reference. In embodiments, the system 1 takes these imperfections into account and provides a solution with improved charging efficiency for realistic road conditions and better dynamic charging utilization compared to conventional systems.

The system 1 includes a system controller 2 configured to assess road surface unevenness 7 along an electric road considered for recharging the electric vehicle 10 when a traction battery 11 of the electric vehicle 10 needs to be recharged. The determination of whether to charge or not may be based on the state of charge of the traction battery 11, for example.

Electric roads are expensive and require elaborate installation and maintenance efforts. Thus, under realistic conditions (for the foreseeable future) only sections of certain roads will likely be electrified to perform wireless charging.

In an embodiment, the system 1 may be communicatively coupled to and/or integrated with, not only a battery control system of the traction battery 11, but also a navigation system of the vehicle 10 (both not shown on FIG. 1) to be able to establish a traveling route based on whether roads are equipped with a charging infrastructure on or below their surface.

The system controller 2 may be configured to assess road surface unevenness 7 by utilizing data acquired with a sensor system 3 of the vehicle 10. The sensor system 3 may be configured to monitor the road in the front of the electric vehicle 10. The sensor system 3 may comprise various technologies as they are already used within electric vehicles for other purposes, e.g. optical cameras, lidars, lasers, and the like. Based on these data, the vehicle 10 may dynamically assess the actual situation in the front of the vehicle 10 in real time.

The system controller 2 may additionally, or alternatively, be configured to assess road surface unevenness 7 by considering road data provided from a vehicle fleet and/or the navigation system of the electric vehicle 10.

The system 1 is thus able to rely on "swarm intelligence" on the one side to assess the road surface situation along the electric road considered for recharging. These data may be wirelessly transmitted via vehicle to everything (V2X) communication. Such information may be provided not only by other vehicles but also by corresponding entities within the road infrastructure.

Additionally, or alternatively, the system 1 can utilize navigation data that may already include detailed information about the actual situation of certain roads with regards to their electric charging capabilities.

The system 1 may be configured to, based on the assessed road surface unevenness 7, adapt at least one of a driving route 8 of the electric vehicle 10, a current driving trajectory 9 of the electric vehicle 10, a recharging configuration of the electric vehicle 10, or a combination thereof. These different provisions may be utilized alone or in combination with each other. The adaption may be optimized to achieve maximum recharging efficiency of the traction battery 11.

The inductive power transfer coupler 4 of the system 1 may be configured to be height-adjustable. The system controller 2 may thus adapt the recharging configuration of the electric vehicle 10 by adapting a height above ground of the inductive power transfer coupler 4 in order to optimize the charging process while taking into account the actual road surface conditions.

For example, the system controller 2 may be configured to adapt the height above ground based on vertical changes in the road surface in the front of the electric vehicle 10. In this regard, the system controller 2 may minimize the height above ground above a certain lower safety margin (to avoid damages to the coil (s) of the inductive coupler 4).

Hence, the underfloor configuration of the vehicle 10 can be adapted based on the road surface ahead. For example, if a bump on the road 6 is detected (e.g., by a camera), the inductive coupler 4 may be moved upwards accordingly. This may reduce charging efficiency but may secure the necessary safety margin. As soon as the bump is passed, the coupler 4 may be returned to its standard lower position (with increased charging efficiency).

Figure 2:
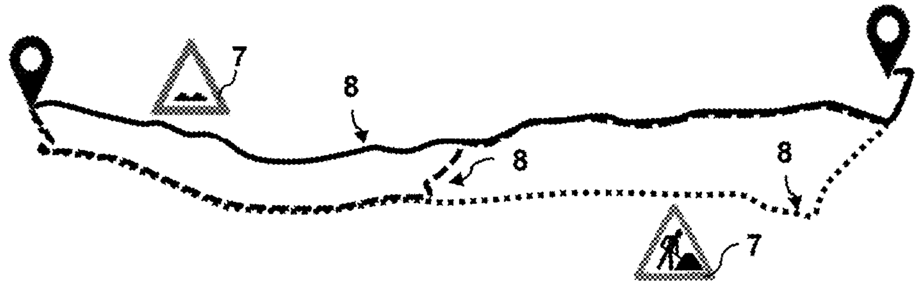
FIG. 2 schematically shows several example routes for the electric vehicle of FIG. 1.

FIG. 2 schematically shows several example routes 8 for the electric vehicle 10 of FIG. 1.

The vehicle 10 may start at a point on the left hand side of FIG. 2 and may have its programmed destination at a point on the right hand side of FIG. 2. As can be seen in FIG. 2, several different partially overlapping routes 8 may be available that could in principle be followed by the vehicle 10. However, two of these routes 8 suffer from an uneven road surface.

For example, the route 8 at the bottom indicated with a dotted line in FIG. 2 has a construction site near its end where the road may be damaged or where the lanes are rerouted to an emergency lane, for example. The route 8 at the top indicated by a solid line in FIG. 2 has a section with a wavy road surface (e.g. longitudinal waves, lane grooves etc.). The optimal route 8 for efficient charging may therefore be the one in the middle (dashed line) that avoids both problematic sections of the other two routes 8.

The system controller 2 may thus be configured to adapt the driving route 8 of the electric vehicle 10 to achieve, for example, the flattest road surface on average during charging, and/or the least frequent adaptations of the recharging configuration of the electric vehicle.

Figure 3:
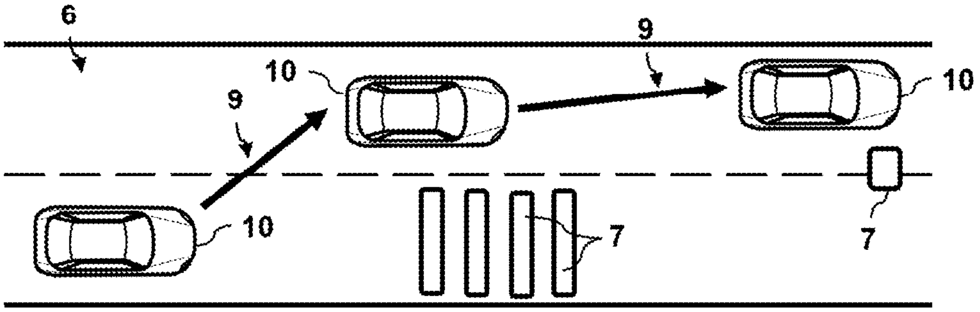
FIG. 3 depicts an example driving situation on an electric road with the electric vehicle of FIG. 1.

FIG. 3 depicts an example driving situation on an electric road 6 with the electric vehicle 10 of FIG. 1.

As can be seen in FIG. 3, the electric road 6 has two lanes, a lower lane having a section in the middle that suffers from road surface waves along its entire lateral extension and an upper lane having a pothole close to its right border.

The system controller 2 may thus be configured to adapt the current driving trajectory 9 of the electric vehicle 10 by changing a lane and/or adjusting a lateral position within the lane to avoid these problematic sections along the road 6. As is indicated in FIG. 3, the vehicle 10 thus could move from the right lane to the left lane to avoid the first road surface unevenness 7 (middle of FIG. 3) and from there to the outer left side of the lane to avoid the second road surface unevenness 7 (right side of FIG. 3).

Figure 4:
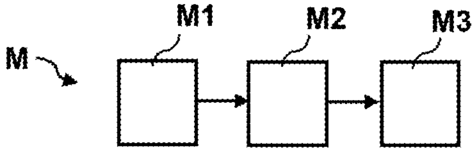
FIG. 4 is a flow diagram of a method for dynamic wireless charging of the electric vehicle of FIG. 1 according to an embodiment of the present disclosure.

FIG. 4 is a flow diagram of a method M for dynamic wireless charging of the electric vehicle 10 of FIG. 1, according to an embodiment. The method M includes an operation M1 in which the system controller 2 of the electric vehicle 10 may determine that the traction battery 11 of the electric vehicle 10 needs to be recharged. The method M further includes an operation M2 in which the system controller 2 may assess the road surface unevenness 7 along an electric road considered for recharging the electric vehicle 10. The method M also includes an operation M3 in which the system controller 2 may, based on the assessed road surface unevenness 7, adapt at least one of the driving route 8 of the electric vehicle 10, the current driving trajectory 9 of the electric vehicle 10, the recharging configuration of the electric vehicle 10, or a combination thereof.

Embodiments of the present disclosure may improve wireless charging by utilizing and/or combining different optimization solutions. For example, information from the sensor system 3 of the vehicle 10 may be used for active adjustment of distance between receiver and transmitter couplers 4, 5. Additionally, or alternatively, data may be gathered from other vehicles regarding road surface conditions (e.g. especially large bumps). Additionally, or alternatively, information from the navigation system may be used, e.g., to avoid unnecessary adjustments/reduce adjustment frequency of the recharging system. In addition to, or instead of, the dynamic real-time reconfiguration of the recharging system (height adjustment of the receiving coupler 4), the route planning (macro improvement with alternative route), as well as the lane planning (micro improvement with best lane on route or best lateral position within selected lane) may be optimized to find the best and most efficient charging solution without risking any damages to the vehicle 10.

In the foregoing detailed description, various features have been grouped together in one or more examples for the purpose of streamlining the disclosure. It should be understood that the above description is intended to be illustrative, and not restrictive. The present disclosure is intended to cover various alternatives, modifications, and equivalents of the different features and embodiments. Many other examples should be apparent to those having ordinary skill in the art upon reviewing the above specification. The disclosed embodiments are shown and described in order to explain the principles of the inventive concept and its practical applications to thereby enable others of ordinary skill in the art to utilize the present disclosure and various embodiments with various modifications as are suited to the particular use contemplated.

REFERENCE LIST

1 system for dynamic wireless charging
2 system control
3 sensor system
4 receiving inductive power transfer coupler
5 transmitting inductive power transfer coupler
6 electric road
7 road surface unevenness
8 driving route
9 driving trajectory
10 electric vehicle
11 traction battery
M method
M1-M3 method steps

What is claimed is:

1. A method for dynamic wireless charging of an electric vehicle on electric roads, the method comprising:
- determining, by a system controller of the electric vehicle, that a traction battery of the electric vehicle needs to be recharged;
- assessing, by the system controller, road surface unevenness along an electric road considered for recharging the electric vehicle; and
- adapting, by the system controller based on the road surface unevenness, at least one of a driving route of the electric vehicle, a current driving trajectory of the electric vehicle, a recharging configuration of the electric vehicle, or a combination thereof,
- wherein the driving route of the electric vehicle is adapted to achieve at least one of the flattest road surface on average during charging, the least frequent adaptations of the recharging configuration of the electric vehicle, or a combination thereof.

2. The method according to claim 1, wherein assessing the road surface unevenness comprises monitoring a road in front of the electric vehicle with a sensor system.

3. The method according to claim 1, wherein assessing the road surface unevenness comprises considering road data provided from at least one of a vehicle fleet, a navigation system of the electric vehicle, or a combination thereof.

4. The method according to claim 1, wherein adapting based on the road surface unevenness is optimized for maximum recharging efficiency of the traction battery.

5. The method according to claim 1, wherein adapting the current driving trajectory of the electric vehicle comprises at least one of changing a lane, adjusting a lateral position within a lane, or a combination thereof.

6. The method according to claim 1, wherein adapting the recharging configuration of the electric vehicle comprises adapting a height above ground of a height-adjustable inductive power transfer coupler of the electric vehicle.

7. The method according to claim 6, wherein the height above ground is adapted based on vertical changes in the road surface in front of the electric vehicle.

8. The method according to claim 6, wherein the height above ground is minimized above a lower safety margin.

9. A system for dynamic wireless charging of an electric vehicle on electric roads, the system comprising:

a system controller configured to determine that a traction battery of the electric vehicle needs to be recharged, assess road surface unevenness along an electric road considered for recharging the electric vehicle, and based on the road surface unevenness, adapt at least one of a driving route of the electric vehicle, a current driving trajectory of the electric vehicle, a recharging configuration of the electric vehicle, or a combination thereof, wherein the system controller is configured to adapt the driving route of the electric vehicle to achieve at least one of the flattest road surface on average during charging, the least frequent adaptations of the recharging configuration of the electric vehicle, or a combination thereof.

10. The system according to claim 9, further comprising a sensor system configured to monitor a road in front of the electric vehicle for assessing road surface unevenness.

11. The system according to claim 9, wherein the system controller is configured to assess road surface unevenness at least by considering road data provided from at least one of a vehicle fleet, a navigation system of the electric vehicle, or a combination thereof.

12. The system according to claim 9, wherein the system controller is configured to adapt based on the road surface unevenness at least by optimizing for maximum recharging efficiency of the traction battery.

13. The system according to claim 9, wherein the system controller is configured to adapt the current driving trajectory of the electric vehicle by at least one of changing a lane, adjusting a lateral position within a lane, or a combination thereof.

14. The system according to claim 9, further comprising a height-adjustable inductive power transfer coupler, wherein the system controller is configured to adapt the recharging configuration of the electric vehicle at least by adapting a height above ground of the height-adjustable inductive power transfer coupler.

15. The system according to claim 14, wherein the system controller is configured to adapt the height above ground based on vertical changes in the road surface in front of the electric vehicle.

16. The system according to claim 14, wherein the system controller is configured to minimize the height above ground above a lower safety margin.

17. An electric vehicle comprising a system for dynamic wireless charging, the system configured to:

determine that a traction battery of the electric vehicle needs to be recharged, assess road surface unevenness along an electric road considered for recharging the electric vehicle, and based on the road surface unevenness, adapt at least one of a driving route of the electric vehicle, a current driving trajectory of the electric vehicle, a recharging configuration of the electric vehicle, or a combination thereof, wherein the system is configured to adapt the driving route of the electric vehicle to achieve at least one of the flattest road surface on average during charging, the least frequent adaptations of the recharging configuration of the electric vehicle, or a combination thereof.

* * * * *